US008173999B2

(12) United States Patent
Lutsen et al.

(10) Patent No.: US 8,173,999 B2
(45) **Date of Patent: *May 8, 2012**

(54) FUNCTIONALIZATION OF POLY(ARYLENE-VINYLENE) POLYMERS FOR ELECTRONIC DEVICES

(75) Inventors: Laurence Lutsen, Coudekerque-Btanche (FR); Dirk Vanderzande, Hasselt (BE); Fateme Banishoeib, Taranto (IT)

(73) Assignees: IMEC, Leuven (BE); Universiteit Hasselt, Diepenbeek (BE)

( * ) Notice: Subject to any disclaimer, the term of this patent is extended or adjusted under 35 U.S.C. 154(b) by 951 days.

This patent is subject to a terminal disclaimer.

(21) Appl. No.: 12/183,937

(22) Filed: Jul. 31, 2008

(65) Prior Publication Data

US 2009/0032811 A1 Feb. 5, 2009

Related U.S. Application Data

(63) Continuation-in-part of application No. 12/026,385, filed on Feb. 5, 2008.

(60) Provisional application No. 60/957,373, filed on Aug. 22, 2007, provisional application No. 61/051,284, filed on May 7, 2008, provisional application No. 61/051,268, filed on May 7, 2008.

(30) Foreign Application Priority Data

Aug. 1, 2007 (EP) .................................... 07447045

(51) Int. Cl.
*C08L 41/00* (2006.01)
*C08L 43/00* (2006.01)
*C08L 81/00* (2006.01)
*C08F 8/34* (2006.01)
*H01L 51/30* (2006.01)

(52) U.S. Cl. ...... 257/40; 525/55; 525/326.6; 525/327.2; 525/328.5; 525/343; 525/350; 525/384; 525/386; 428/500; 257/E51.027; 528/321

(58) Field of Classification Search ........................ None
See application file for complete search history.

(56) References Cited

U.S. PATENT DOCUMENTS 5,526,031 A * 6/1996 Kurabayashi ................ 347/105

FOREIGN PATENT DOCUMENTS

EP 1529794 A 5/2005
EP 1548044 A 6/2005

* cited by examiner

*Primary Examiner* — John J Figueroa

(74) *Attorney, Agent, or Firm* — Knobbe Martens Olson & Bear LLP

(57) ABSTRACT

A method is provided for modifying a poly(arylene vinylene) or poly(heteroarylene vinylene) precursor polymer having dithiocarbamate moieties by reacting it with an acid and further optionally reacting the acid-modified polymer with a nucleophillic agent. Also provided are novel polymers and copolymers bearing nucleophillic side groups which are useful as components of electronic devices, e.g. in the form of thin layers.

14 Claims, 1 Drawing Sheet

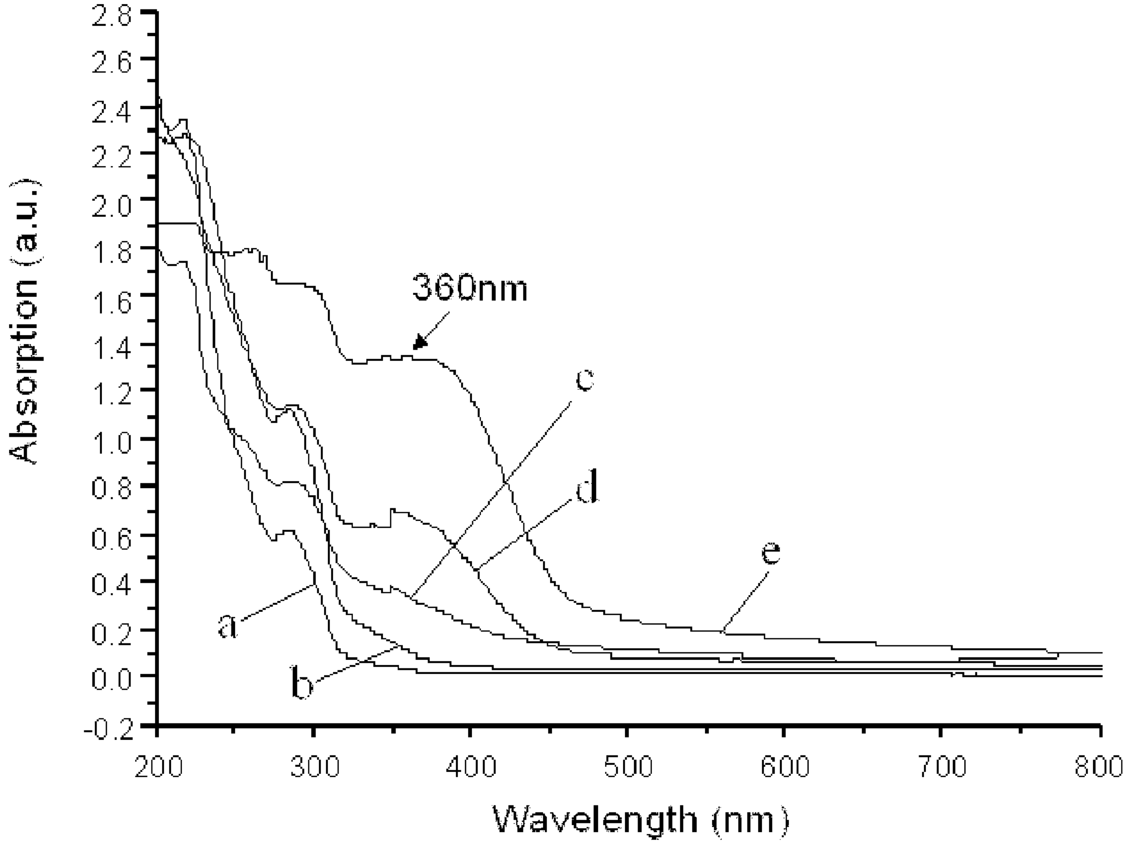
Absorption (a.u.)
2.8
2.6
2.4
2.2
2.0
1.8
1.6
1.4
1.2
1.0
0.8
0.6
0.4
0.2
0.0
-0.2
360nm
a
b
c
d
e
200
300
400
500
600
700
800
Wavelength (nm)

FUNCTIONALIZATION OF POLY(ARYLENE-VINYLENE) POLYMERS FOR ELECTRONIC DEVICES

CROSS-REFERENCE TO RELATED APPLICATIONS

This application is a continuation-in-part of U.S. application Ser. No. 12/026,385 filed Feb. 5, 2008, which claims the benefit under 35 U.S.C. § 119(e) of U.S. provisional application Ser. No. 60/957,373 filed Aug. 22, 2007, and claims the benefit under 35 U.S.C. § 119(a)-(d) of European application No. 07447045.1 filed Aug. 1, 2007. This application claims the benefit under 35 U.S.C. § 119(e) of U.S. provisional application Ser. No. 61/051,284 filed May 7, 2008, and U.S. provisional application Ser. No. 61/051,268 filed May 7, 2008. The disclosures of each of the foregoing applications are hereby expressly incorporated by reference in their entirety and are hereby expressly made a portion of this application.

FIELD OF THE INVENTION

A method is provided for the modification and optionally the further functionalization of poly(arylene-vinylene) and poly(heteroarylene-vinylene) precursor polymers by means of an acid. Also provided are a class of novel polymers and copolymers obtainable by this method and electronic devices comprising layers of such novel polymers and copolymers.

BACKGROUND OF THE INVENTION

Conjugated polymers are of great interest for the development of optical and electronic applications because of their extended π-electron delocalization along the backbone. A problem however frequently occurring during the synthesis of conjugated polymers is their insolubility due to their rigid backbone. Quite often the solubility problem is circumvented by the use of a soluble and easily processable non-conjugated precursor polymer. Nowadays, such precursor polymers can be synthesized via several different routes (e.g. sulfonium or Wessling-Zimmerman precursor route, xanthate precursor route and sulfinyl precursor route) having in common that they make use of polymerization behavior of p-quinodimethane systems. These routes differ however in the choice of the leaving group and polarizer group in the premonomer structure and in the polymerization conditions (base and solvents, reaction temperatures and reaction time) used. Initially, these methods were developed for the synthesis of poly (1,4-phenylene vinylene) (hereinafter referred as PPV) derivatives and were later adapted for the synthesis of other poly (heteroarylene vinylene) derivatives, but with mixed success. Especially the synthesis of electron rich conjugated polymers such as poly (2,5-thienylene vinylene) (hereinafter referred as PTV) via these precursor routes is problematic. In particular, the high reactivity of intermediates or even the monomer itself precludes the development of a reproducible, versatile, low polydispersity and high yield polymerization process towards PTV derivatives, due to the electron rich nature of the thiophene ring.

Accordingly there is still a strong need in the art for improving the conversion (also called elimination reaction) of a poly(arylene vinylene) precursor polymer into a conjugated poly (arylene-vinylene) polymer such as PPV or PTV. There is also a need in the art for providing alternative derivatives of conjugated poly (arylene-vinylene), e.g. through the functionalization of such precursor polymers, which may exhibit unexpectedly unique physical, chemical and/or electrical properties. There is also a need in the art for providing alternative layer components for electronic or optical devices such as, but not limited to, solar cells, light-emitting diodes, chemical sensors, biological sensors and integrated circuits.

U.S. Pat. No. 5,817,430 describes a process for the preparation of polymers comprising: polymerizing at least one monomer of the formula $X—CH_2—Ar—CH_2—X'$ in the presence of a base and at least one chain end controlling additive of the formula R—H to form a soluble conjugated poly(arylene vinylene) of the formula $R—CH_2—[Ar—CH{=}CH—]_n—Ar—CH_2—R$ where X and X' are electron withdrawing groups, R—H is a compound containing at least one acidic proton, R is a nucleophile, Ar is an aryl or aromatic group with from 5 to 30 carbon atoms, and n represents the number of repeating segments.

SUMMARY OF THE INVENTION

Accordingly, there is still a need in the art for methods enabling the conversion of poly(arylene vinylidene) precursor polymers and for new methods enabling the functionalization of polymers comprising arylene-vinylidene repeating units.

A cost-effective and environmentally-friendly solution to one or more of the above outlined problems is provided by the methods of the preferred embodiments, especially by designing a poly(arylene vinylene) precursor polymer modification method being free from the prior art drawbacks and limitations.

According to a first aspect, a method is provided for the acid-induced modification of dithiocarbamate-containing precursor polymers, e.g. polymers comprising arylene or heteroarylene divalent groups in the main chain and dithiocarbamate groups as side groups. The modification can be (a) the partial or total conversion of a precursor into a conjugated polymer, (b) the partial conversion of a precursor followed by a nucleophillic substitution to replace dithiocarbamate groups by another nucleophillic group, (c) the simultaneous occurrence of the partial conversion of a precursor into a conjugated polymer and the nucleophillic substitution to replace dithiocarbamate groups by another nucleophillic group or (d) a nucleophillic substitution to replace dithiocarbamate groups by another nucleophillic group on a precursor followed by the partial or total conversion of the precursor into a conjugated polymer. The method of the preferred embodiments is particularly suitable for the improved conversion (partial or complete conversion) of such dithiocarbamate-containing precursor polymers into e.g. poly (arylene-vinylene) or poly(heteroarylene-vinylene) polymers or copolymers. It has been surprisingly found that this embodiment is specific to dithiocarbamate-containing precursor polymers and is not applicable to the corresponding xanthate-containing precursor polymers, e.g. polymers comprising arylene or heteroarylene divalent groups in the main chain and xanthate groups as side groups. According to another useful embodiment, the method can further include the reaction of said partially converted (acid-modified) poly (arylene-vinylene) or poly(heteroarylene-vinylene) polymers or copolymers with a nucleophillic agent. This embodiment is particularly suitable for the functionalization of polymers after polymerization (without subjecting the function to be introduced to polymerization conditions), also called post polymer functionalization.

According to a second aspect, a broad class of novel polymers and copolymers is provided obtainable by embodiments of the above methods and which comprise arylene or heteroarylene divalent groups in the main chain and at least a monomeric moiety including a nucleophile as a side chain or side group.

According to a third aspect, a device is provided comprising layers, preferably thin layers, of a novel polymer or copolymer according to the second aspect. According to a specific embodiment, this device can be, but is not limited to, a semiconductor device, a solar cell, a light-emitting diode, a chemical sensor, a biological sensor or an integrated circuit component.

In an embodiment of the first aspect, the acid used for polymer modification may be used in an amount ranging from about 0.1 to 3 molar equivalents of the dithiocarbamate moieties present in said polymer.

In another embodiment of the first aspect, reacting said polymer with said acid may be performed at a temperature ranging from about −30° C. to about +130° C., e.g. from about 20° C. to about 100° C.

In another embodiment of the first aspect, the method may comprise adding a nucleophile agent (e.g. whereby a post-functionalized polymer is obtained) such as, but not limited to, alcohols, thiols, phenols, thiophenols, dialkylsulfurs, aminoalkanes, anilines, carboxylic acids, carboxylic aldehydes, carboxylic acid esters, thiocarboxylic acids and esters thereof, xanthates, carboxylic acid amides, amino-acids, peptides, nucleosides, heterocyclic bases, alkaloids and modified DNA.

This embodiment is able to produce polymers and copolymers according to the second aspect wherein the nucleophile Nu present as a side group may be selected from the group consisting of $OR_5$, $SR_5$, $NHR_6$, $OC(O)R_5$, $SC(O)R_5$, wherein each of $R_5$ and $R_6$ is selected from the group consisting of $C_{1-20}$ alkyl, $C_{2-20}$ alkenyl, and aryl.

Within this embodiment, said nucleophile agent may be added in an amount ranging from about 0.1 to about 10 molar equivalents of the dithiocarbamate moieties present in said polymer represented by the structural formula (I).

BRIEF DESCRIPTION OF THE DRAWINGS

FIG. 1 is the UV-Visible spectra of iptycene polymer derivatives according to a preferred embodiment.

DETAILED DESCRIPTION OF THE PREFERRED EMBODIMENT

Definitions

As used herein with respect to a substituting group, and unless otherwise stated, the term "$C_{1-4}$ alkyl" refers to a straight (non-branched) or branched chain saturated acyclic hydrocarbon monovalent group having from 1 to 4 carbon atoms such as, for example, methyl, ethyl, propyl, n-butyl, 1-methylethyl (isopropyl), 2-methylpropyl (isobutyl), and 1,1-dimethylethyl (tert-butyl). Similarly, the term "$C_{1-20}$ alkyl" refers to straight (non-branched) or branched chain groups having from 1 to 20 carbon atoms such as, for example, pentyl, hexyl, heptyl, octyl, nonyl, decyl, dodecyl, tetradecyl, hexadecyl, octadecyl and the like.

As used herein with respect to a substituting group, and unless otherwise stated, the term "aryl" designates any mono- or polycyclic aromatic monovalent hydrocarbon group having from 6 to 30 carbon atoms such as, but not limited to, phenyl, naphthyl, anthracenyl, phenanthracyl, fluoranthenyl, chrysenyl, pyrenyl, biphenylyl, terphenyl, picenyl, indenyl, biphenyl, indacenyl, tetrahydropyrenyl, benzocyclobutenyl, benzocyclooctenyl and the like, including fused benzo-$C_{4-8}$ cycloalkyl groups such as, for instance, indanyl, tetrahydronaphthyl, fluorenyl and the like, all of the said groups being optionally substituted with one or more substituents (preferably 1 to 3 substituents) independently selected from the group consisting of halogen, $C_{1-10}$ alkyl, nitro, trifluoromethoxy, halo $C_{1-7}$ alkyl and $C_{1-4}$ alkoxy (all of such substituents being such as herein defined, including individual species and sub-groups thereof), such as for instance 4-fluorophenyl, 4-chlorophenyl, 3,4-dichlorophenyl, 2,6-dichlorophenyl, 2-fluorophenyl, 3-chlorophenyl, 3,5-dichloro-phenyl, trifluoromethylphenyl and 3,4-dimethoxyphenyl, iodo-phenyl, bromo-phenyl.

As used herein with respect to a substituting group, and unless otherwise stated, the term "heterocyclyl" means a mono- or polycyclic, saturated or mono-unsaturated or polyunsaturated monovalent hydrocarbon group having from 2 to 15 carbon atoms and including one or more heteroatoms in one or more heterocyclic rings, each of said rings having from 3 to 10 atoms (and optionally further including one or more heteroatoms attached to one or more carbon atoms of said ring, for instance in the form of a carbonyl, and/or to one or more heteroatoms of said ring, for instance in the form of a sulfone, sulfoxide or N-oxide), each of said heteroatoms being independently selected from the group consisting of nitrogen, oxygen and sulfur, also including groups wherein a heterocyclic ring is fused to one or more aromatic hydrocarbon rings for instance in the form of benzo-fused, dibenzo-fused and naphtho-fused heterocyclic groups; within this definition are included heterocyclic groups such as, but not limited to, diazepinyl, oxadiazinyl, thiadiazinyl, dithiazinyl, triazolonyl, diazepinonyl, triazepinyl, triazepinonyl, tetrazepinonyl, benzoquinolinyl, benzo-thiazinyl, benzothiazinonyl, benzoxathiinyl, benzodioxinyl, benzodithiinyl, benzoxaze-pinyl, benzothiazepinyl, benzodiazepinyl, benzodioxepinyl, benzo-dithiepinyl, benzoxazocinyl, benzothiazocinyl, benzodiazocinyl, benzoxathiocinyl, benzodioxocinyl, benzotrioxepinyl, benzoxathiazepinyl, benzoxadiazepinyl, benzothiadiazepinyl, benzotriazepinyl, benzoxathiepinyl, benzotriazinonyl, benzoxazolinonyl, azetidinonyl, azaspiroundecyl, dithiaspirodecyl, selenazinyl, selenazolyl, selenophenyl, hypoxanthinyl, azahypoxanthinyl, bipyrazinyl, bipyridinyl, oxazolidinyl, diselenopyrimidinyl, benzodioxocinyl, benzopyrenyl, benzopyranonyl, benzophenazinyl, benzoquinolizinyl, dibenzocarbazolyl, dibenzoacridinyl, dibenzo-phenazinyl, dibenzothiepinyl, dibenz-oxepinyl, dibenzopyranonyl, dibenzoquino-xalinyl, dibenzothiazepinyl, dibenzisoquinolinyl, tetraazaadamantyl, thiatetra-azaadamantyl, oxauracil, oxazinyl, dibenzothiophenyl, dibenzofuranyl, oxazolinyl, oxazolonyl, azaindolyl, azolonyl, thiazolinyl, thiazolonyl, thiazolidinyl, thiazanyl, pyrimidonyl, thiopyrimidonyl, thiamorpholinyl, azlactonyl, naphtindazolyl, naphtindolyl, naphtothiazolyl, naphtothioxolyl, naphtoxindolyl, naphthotriazolyl, naphthopyranyl, oxabicycloheptyl, azabenzimidazolyl, azacycloheptyl, azacyclooctyl, azacyclononyl, azabicyclononyl, tetrahydrofuryl, tetrahydropyranyl, tetrahydropyronyl, tetrahydroq uinoleinyl, tetrahydrothienyl and dioxide thereof, dihydrothienyl dioxide, dioxindolyl, dioxinyl, dioxenyl, dioxazinyl, thioxanyl, thioxolyl, thiourazolyl, thiotriazolyl, thiopyranyl, thiopyronyl, coumarinyl, quinoleinyl, oxyquinoleinyl, quinuclidinyl, xanthinyl, dihydropyranyl, benzodihydrofuryl, benzothiopyronyl, benzothiopyranyl, benzoxazinyl, benzoxazolyl, benzodioxolyl, benzodioxanyl, benzothiadiazolyl, benzotriazinyl, benzothiazolyl, benzoxazolyl, phenothioxinyl, phenothiazolyl, phenothienyl (benzothiofuranyl), phenopyronyl, phenoxazolyl, pyridinyl, dihydropyridinyl, tetrahydropyridinyl, piperidinyl, morpholinyl, thiomorpholinyl, pyrazinyl, pyrimidinyl, pyridazinyl, triazinyl, tetrazinyl, triazolyl, benzotriazolyl, tetrazolyl, imidazolyl, pyrazolyl, thiazolyl, thiadiazolyl, isothiazolyl, oxazolyl, oxadiazolyl, pyrrolyl, furyl, dihydrofuryl, furoyl, hydantoinyl, dioxolanyl, dioxolyl, dithianyl, dithienyl, dithiinyl, thienyl, indolyl, indazolyl, benzofuryl, quinolyl, quinazolinyl, quinoxalinyl, carbazolyl, phenoxazinyl, phenothiazinyl, xanthenyl, purinyl, benzothienyl, naphtothienyl, thianthrenyl, pyranyl, pyronyl, benzopyronyl, isobenzofuranyl, chromenyl, phenoxathiinyl, indolizinyl, quinolizinyl, isoquinolyl, phthalazinyl, naphthiridinyl, cinnolinyl, pteridinyl, carbolinyl, acridinyl, perimidinyl, phenanthrolinyl, phenazinyl, phenothiazinyl, imidazolinyl, imidazolidinyl, benzimidazolyl, pyrazolinyl, pyrazolidinyl, pyrrolinyl, pyrrolidinyl, piperazinyl, uridinyl, thymidinyl, cytidinyl, azirinyl, aziridinyl, diazirinyl, diaziridinyl, oxiranyl, oxaziridinyl, dioxiranyl, thiiranyl, azetyl, dihydroazetyl, azetidinyl, oxetyl, oxetanyl, oxetanonyl, homopiperazinyl, homopiperidinyl, thietyl, thietanyl, diazabicyclooctyl, diazetyl, diaziridinonyl, diaziridinethionyl, chromanyl, chromanonyl, thiochromanyl, thiochromanonyl, thiochromenyl, benzofuranyl, benzisothiazolyl, benzocarbazolyl, benzochromonyl, benzisoalloxazinyl, benzocoumarinyl, thiocoumarinyl, phenometoxazinyl, phenoparoxazinyl, phentriazinyl, thiodiazinyl, thiodiazolyl, indoxyl, thioindoxyl, benzodiazinyl (e.g. phtalazinyl), phtalidyl, phtalimidinyl, phtalazonyl, alloxazinyl, dibenzopyronyl (i.e. xanthonyl), xanthionyl, isatyl, isopyrazolyl, isopyrazolonyl, urazolyl, urazinyl, uretinyl, uretidinyl, succinyl, succinimido, benzylsultimyl, benzylsultamyl, thieno-thiophenyl, pyrrolo-pyrrolyl, dibenzothiophenyl, and the like, wherein each carbon atom of said heterocyclic ring may furthermore be independently substituted; depending upon the number of unsaturations in the 3 to 10 atoms ring, heterocyclic groups may be sub-divided into heteroaromatic (or "heteroaryl") groups and non-aromatic heterocyclic groups according to standard knowledge in the art; when a heteroatom of said heterocyclic group is nitrogen, the latter may be substituted with a substituent selected from the group consisting of $C_{1-4}$ alkyl, aryl or aryl-$C_{1-4}$ alkyl (all of them being such as herein defined, including sub-groups thereof).

As used herein with respect to a substituting atom, and unless otherwise stated, the term halogen means any atom selected from the group consisting of fluorine, chlorine, bromine and iodine.

As used herein with respect to a substituting group, and unless otherwise stated, the term "halo $C_{1-4}$ alkyl" means a $C_{1-4}$ alkyl group (such as above defined, including sub-groups thereof) in which one or more hydrogen atoms are independently replaced by a corresponding number of independently selected halogen atoms (preferably fluorine, chlorine or bromine) such as, but not limited to, fluoromethyl, difluoromethyl, trifluoromethyl, chloromethyl, chlorodifluoromethyl, dichlorofluoromethyl and the like.

As used herein with respect to a substituting group, and unless otherwise stated, the term "$C_{1-20}$ alkoxy" refers to substituents wherein a carbon atom of a $C_{1-20}$ alkyl group (such as defined herein above, including sub-groups thereof), is attached to an oxygen atom through a single bond such as, but not limited to methoxy, ethoxy, propoxy, n-butoxy, isopropoxy, sec-butoxy, tert-butoxy, pentyloxy, undecyloxy and the like.

As used herein with respect to a substituting group, and unless otherwise stated, the term "arylalkyl" refers to an aliphatic saturated hydrocarbon monovalent group (preferably a $C_{1-20}$ alkyl group such as defined above, including sub-groups thereof) onto which an aryl group (such as defined above, including sub-groups thereof) is bonded such as, but not limited to, benzyl, 4-chlorobenzyl, 4-fluorobenzyl, 2-fluorobenzyl, 3,4-dichlorobenzyl, 2,6-dichlorobenzyl, and phenylethyl.

As used herein with respect to a substituting group, and unless otherwise stated, the term "$C_{3-20}$ cycloalkyl" means a monocyclic saturated hydrocarbon monovalent group having from 3 to 20 carbon atoms, such as for instance cyclopropyl, cyclobutyl, cyclopentyl, cyclohexyl, cycloheptyl, cyclooctyl and the like.

As used herein with respect to a substituting group, and unless otherwise stated, the term "$C_{1-20}$ alkylsulfate" refers to substituents wherein a carbon atom of a $C_{1-20}$ alkyl group (such as defined herein above, including sub-groups thereof), is attached to an oxygen atom of a sulfate group through a single bond such as, but not limited to methylsulfate (methoxysulfonyloxy), ethylsulfate (ethoxysulfonyloxy), n-butylsulfate (n-butoxysulfonyloxy), tert-butylsulfate (tert-butoxysulfonyloxy), undecylsulfate (undecyloxysulfonyloxy), and the like.

As used herein with respect to a linking group, and unless otherwise stated, the term "arylene" designates any divalent group derived from aryl (such as above defined) by abstracting a hydrogen atom.

As used herein with respect to a linking group, and unless otherwise stated, the term "heteroarylene" designates any divalent group derived from heteroaryl (such as above defined) by abstracting a hydrogen atom.

As used herein with respect to an arylene group, and unless otherwise stated, the term "iptycene" refers to a divalent group wherein three benzene rings are bridged together about a [2,2,2] tricyclic ring system (see for instance formula V-XI). Iptycenes include, but are not limited to, triptycenes (3 planes such as e.g. in the structural formulae V, VII, VIII and X) and pentiptycenes (5 planes such as e.g. in the structural formulae VI, IX and XI) as examples in which the arenes planes are fused together at the [2,2,2] bicyclooctane junctions. The arene planes may be a monocyclic aromatic (such as a benzene ring), a polycyclic aromatic (such as, but not limited to, fused benzene rings) or a cycloalkadiene structure.

As used herein with respect to a reactant in a functionalization method, and unless otherwise stated, the term "nucleophile" designates any species (neutral "neutral nucleophiles" or negatively charged) that are attracted to positive sources. Typical nucleophiles are any negative or neutral atom that has a lone pair to donate. Nucleophiles can also be called Lewis base because they can donate electrons during a chemical reaction (nucleophillic substitution).

As used herein with respect to a nucleophile agent or a substituting group, and unless otherwise stated, the term "amino-acid" refers to a group derived from a molecule having the chemical formula $H_2N—CHR—COOH$, wherein R is the side group of atoms characterizing the amino-acid type; said molecule may be one of the 20 naturally-occurring amino-acids or any similar non naturally-occurring amino-acid.

As used herein with respect to a nucleophile agent or a substituting group, and unless otherwise stated, the term "alkaloid" refers to a nitrogenous organic molecule having a pharmacological effect on a human being or another mammal.

As used herein and unless provided otherwise, the terms "poly(ethylene oxide)" refer to a polymer having the following general formula $HO—(CH_2—CH_2—O—)_n—H$ wherein n is from 11 to about 200,000.

As used herein and unless provided otherwise, the terms "oligo(ethylene oxide)" refer to a monomer or low molecular weight polymer having the following general formula $HO—(CH_2—CH_2—O—)_n—H$ wherein n is from 1 to 10.

According to a first aspect, a method is provided for modifying a polymer having dithiocarbamate moieties and being represented by the structural formula (I)

(I)

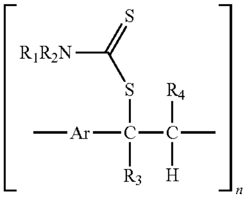

wherein:

- Ar is arylene or heteroarylene optionally substituted with one or more substituents independently selected from the group consisting of $C_{1-20}$ alkyl $C_{1-20}$ alkoxy, $C_{1-20}$ alkylsulfate, poly(ethylene oxide) (PEO) or oligo(ethylene oxide), poly(ethylene glycol) (PEG) or oligo(ethylene glycol), aryl and aryl-$C_{1-4}$ alkyl wherein said heteroarylene may comprise up to 4 heteroatoms independently selected from the group consisting of oxygen, sulfur, and nitrogen,
- $R_1$ and $R_2$ are independently selected from the group consisting of $C_{1-20}$ alkyl $C_{3-20}$ cycloalkyl, aryl, aryl-$C_{1-4}$ alkyl and heterocyclyl,
- $R_3$ and $R_4$ are independently selected from the group consisting of hydrogen, $C_{1-20}$ alkyl $C_{3-20}$ cycloalkyl, aryl, aryl-$C_{1-4}$ alkyl and heterocyclyl, and
- n is such that the number average molecular weight of the polymer is in the range from 5.000 to 1.000.000 Dalton, wherein said method comprises a step of reacting said polymer with an acid.

The reaction conditions may be such that polymer modification can be a conversion of the polymer (such as forming a totally or partially conjugated polymer as described below, e.g. with respect to structural formula II) and/or a substitution of at least a part of the dithiocarbamate moieties to thereby introduce another functionality. The reactions conditions may also be such that polymer modification optionally involves protonation of at least a part of the dithiocarbamate moieties.

In an embodiment, Ar may also be a rigid three-dimensional group. In another preferred embodiment, the arylene or heteroarylene divalent group Ar may be selected from the group consisting of 1,4-phenylene; 2,6-naphthalenediyl; 1,4-naphthalenediyl; 1,4-anthracenediyl; 2,6-anthracenediyl; 9,10-anthracenediyl; 2,5-thienylene; 2,5-furanediyl; 2,5-pyrrolediyl; 1,3,4-oxadiazole-2,5-dyil; 1,3,4-thiadiazole-2,5-diyl; 2,3-benzo[c]thienylene; thieno[3,2-b]thiophene-2,5-diyl; pyrrolo[3,2-b]pyrrole-2,5-diyl; pyrene-2,7-diyl; 4,5,9,10-tetrahydropyrene-2,7-diyl; 4,4'-bi-phenylene; phenantrene-2,7-diyl; 9,10-dihydrophenantrene-2,7-diyl; dibenzo-furane-2,7-diyl; dibenzothiophene-2,7-diyl; substituted and non-substituted triptycenylene; substituted and non-substituted pentiptycenylene or substituted and non-substituted iptycenylene. For instance, Ar may comprise an iptycene group as defined herein.

In a particular preferred embodiment, Ar may be an iptycene group or derivatives of an iptycene group wherein three benzene rings are bridged/fused together about a [2,2,2] tricyclic ring system. Iptycenes include triptycenes (3 planes) and pentiptycenes (5 planes) as examples in which the arenes planes are fused together at the [2,2,2] bicyclooctane junctions.

In a specific preferred embodiment, the iptycyl group may be represented by one the following formulae (V) to (XI):

V

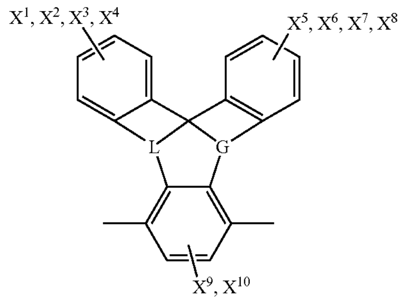

VI

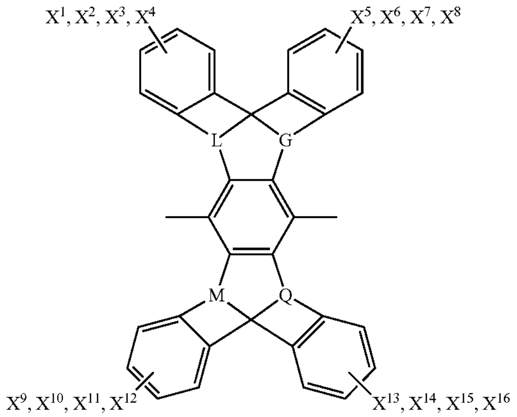

VII

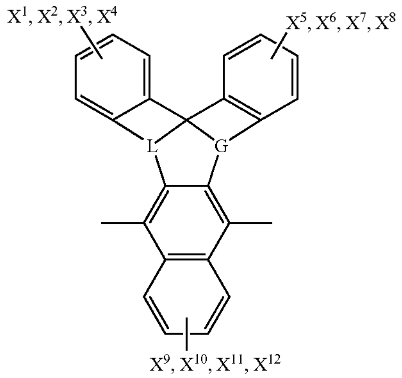

VIII

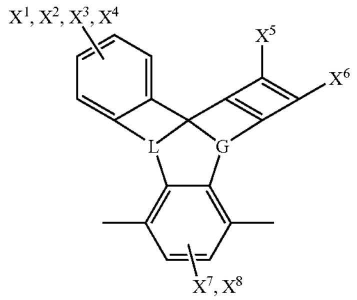

-continued

IX

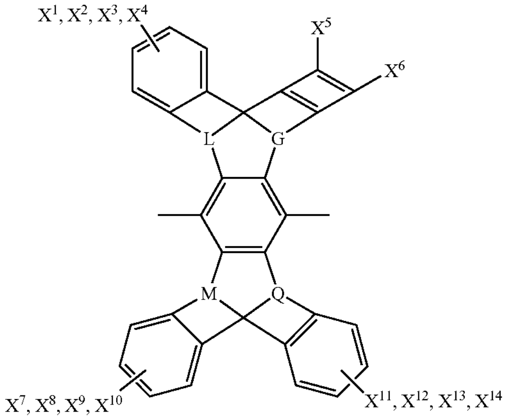

X

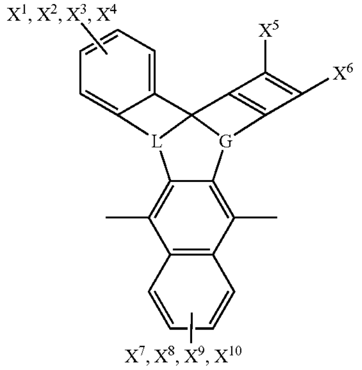

XI

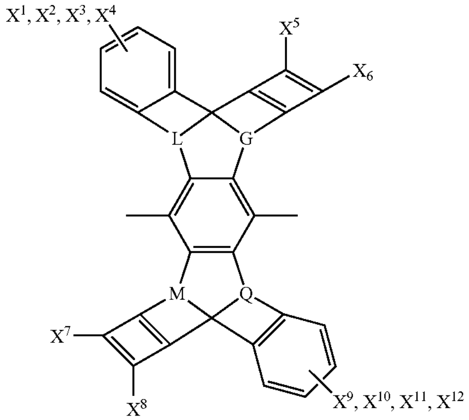

wherein:

each of $X^1$ to $X^{16}$ is independently selected from the group consisting of hydrogen, linear or branched $C_{1-20}$ alkyl and $C_{1-20}$ alkoxy and wherein, if the main chain of said linear or branched $C_{1-20}$ alkyl or $C_{1-20}$ alkoxy includes at least 3 carbon atoms, one or more non-adjacent CH or $CH_2$ divalent groups of said linear or branched $C_{1-20}$ alkyl and $C_{1-20}$ alkoxy may independently be replaced by O, S, C(=O), C(=O)O, OC(=O), NH, N—$C_{1-4}$ alkyl or NC(=O) and/or wherein one or more hydrogens may be each independently replaced by a substituent selected from the group consisting of fluoro, chloro, aryl, aryloxy, COOR, $SO_3R$, CN, and $NO_2$ wherein R is selected from the group consisting of $C_{1-20}$ alkyl, $C_{2-20}$ alkenyl and aryl;

each of G, L, M and Q is independently selected from the group consisting of N, P, As and $CX^{17}$;

each $X^{17}$ is independently selected from the group consisting of hydrogen, $C_{1-20}$ alkyl and $C_{1-20}$ alkoxy, wherein if the main chain of said $C_{1-20}$ alkyl or $C_{1-20}$ alkoxy includes at least 3 carbon atoms, one or more non-adjacent CH or $CH_2$ divalent groups of said $C_{1-20}$ alkyl and $C_{1-20}$ alkoxy may independently be replaced by O, S, C(=O), C(=O)O, OC(=O), NH, N—$C_{1-4}$ alkyl or NC(=O) wherein one or more hydrogen atoms may be each independently replaced by a substituent selected from the group consisting of fluoro, chloro, aryl and CN.

According to a specific preferred embodiment, Ar is 1,4-phenylene or 2,5-thienylene.

Precursor polymers of poly(arylene-vinylene) and poly (heteroarylene-vinylene), for instance PTV (polythienylene-vinylene) precursors or PPV (polyphenylene-vinylene) precursors that are suitable for modification according to particular embodiments (and having for formula (I)) can be prepared by any method known in the art such as, for example, by means of competitive nucleophillic substitution of the Wessling polyelectrolyte "Wessling route" with sodium diethyl dithiocarbamate or by means of polymerization of starting monomers bearing dithiocarbamate groups "dithiocarbamate route", stable in time, leading in high yields to precursor polymers with high molecular weight and/or high $\lambda_{max}$ values.

The modification process according to preferred embodiments can suitably be effected in solution in one or more organic solvents. The selection of an appropriate solvent is within the ordinary skill of the skilled person and depends namely upon the solubility of the precursor polymer and/or the type (organic or inorganic) of acid used and/or the solubility of the acid used for polymer modification. Where a nucleophillic reagent is used, its solubility can also be taken into account. Effective solvents have been found to include "non-polar solvents", "polar aprotic solvents", and "polar protic solvents" such as, but not limited to, aliphatic hydrocarbons (e.g. alkanes), heterocyclic hydrocarbons, ethers, halogenated aliphatic hydrocarbons (e.g. halomethanes), aliphatic carboxylic acid esters (e.g. alkyl acetates), ketones, nitrites, formamides, dimethyl sulfoxide, alkanoic acids (e.g. acetic acid, propanoic acid or butyric acid), alcohols, aromatic hydrocarbons and aromatic halogenated hydrocarbons, and more particularly such as, but not limited to, chlorobenzene, dichlorobenzene (all isomers thereof), trichlorobenzene, dichlorofluorobenzene (all isomers thereof), chlorodifluorobenzene (all isomers thereof), toluene, xylene and the like, and mixtures thereof in all proportions. The amount of acid that is suitable for performing the process according to preferred embodiments may depend upon the specific acid used but is usually from about 0.1 to about 3.0 molar equivalents of the dithiocarbamate moieties present in the polymer to be modified, e.g. between 0.5 and 2.0 molar equivalents, for instance from 1.0 to 1.5 molar equivalents of the dithiocarbamate moieties of the polymer.

The process according to the first aspect can be performed over a broad range of temperatures depending namely upon parameters such as the type of solvent such as from about −30° C. to about +130° C., e.g. from about 20 to about 100° C., for instance from about 20 to about 70° C. or from about 20 to about 50° C.

According to another specific embodiment of the method, the pKa of the acid used for polymer modification may be from about −10 to about 11, e.g. from about −3 to about 4. For instance, the pKa value can be about 4. The pKa of the main available organic and inorganic acids (usually measured at room temperature, i.e. about 25° C., in aqueous solutions) is widely available in literature (for instance in Handbook of Chemistry and Physics $81^{st}$ edition (2000), CRC Press, pages 8-44 to 8-56). In accordance with a particular embodiment, it is preferred that the pKa (measured at room temperature—about 25° C.—in aqueous solutions) of said acid used for polymer modification is lower than about 4, i.e. with exclusion of the so-called weak acids. Based on the above criteria, acids suitable for the practice of the preferred embodiments mainly include inorganic acids such as, but not limited to, hydrogen iodide, hydrogen bromide, hydrogen chloride, hydrogen fluoride, sulfuric acid, nitric acid, iodic acid, periodic acid and perchloric acid, as well as HOClO, $HOClO_2$ and $HOIO_3$. Some organic acids are also suitable for the practice of certain preferred embodiments, including but not limited to:

- phosphonic acids of general formula $RP(O)(OH)_2$ wherein R is a hydrocarbyl group;
- sulfonic acids including optionally substituted alkylsulfonic acids and arylsulfonic acids such as, but not limited to, methanesulfonic acid, aminobenzenesulfonic acid (all 3 isomers thereof), benzenesulfonic acid, naphthalenesulfonic acid, sulfanilic acid and trifluoromethanesulfonic acid;
- monocarboxylic acids including optionally substituted alkylcarboxylic mono-acids and arylalkylcarboxylic mono-acids such as, but not limited to, acetoacetic acid, barbituric acid, bromoacetic acid, bromobenzoic acid (both ortho and meta isomers thereof), chloroacetic acid, chlorobenzoic acid (all 3 isomers thereof), chlorophenoxyacetic acid (all 3 isomers thereof), chloropropionic acid (both α and β isomers thereof), cis-cinnamic acid, cyanoacetic acid, cyanobutyric acid, cyanophenoxyacetic acid (all 3 isomers thereof), cyanopropionic acid, dichloroacetic acid, dichloroacetylacetic acid, dihydroxybenzoic acid, dihydroxymalic acid, dihydroxytartaric acid, dinicotinic acid, diphenylacetic acid, fluorobenzoic acid, formic acid, furanecarboxylic acid, furoic acid, glycolic acid, hippuric acid, iodoacetic acid, iodobenzoic acid, lactic acid, lutidinic acid, mandelic acid, α-naphthoic acid, nitrobenzoic acid, nitrophenylacetic acid (all 3 isomers thereof), o-phenylbenzoic acid, thioacetic acid, thiophene-carboxylic acid, trichloroacetic acid and trihydroxybenzoic acid; and
- other acidic substances such as fluoro or nitro-substituted alcohols, e.g. substituted phenols as but not limited to picric acid (2,4,6-trinitrophenol), and ketones such as, but not limited to, uric acid (trihydroxy-2,6,8-purine or its ketonic form).

Acids suitable for the practice of certain preferred embodiments also include, as an alternative embodiment, one of the above acids being generated in situ by methods available in the art. For instance this includes the so-called photo-acid generators, i.e. compounds capable of conversion into acids upon exposure to radiation, e.g. visible light sources or deep ultraviolet (UV) light sources at short wavelengths such as the range from about 100 nm to about 350 nm, or ionizing radiation such as electron-beam or X-rays. Exemplary such photo-acid generators are well known in the field of transferring images to a substrate, especially in the field of photo-resist compositions and patterning processes, and include for instance monomeric generators such as, but not limited to:

- bis-sulfonyldiazomethanes, bis(cyclohexylsulfonyl)diazomethane and sulfonyldiazomethanes of U.S. Pat. No. 6,689,530;
- iodonium salts and sulfonium salts (including the sulfonium salt mixtures of U.S. Pat. No. 6,638,685, especially wherein two groups of a sulfonium cation together form an oxo substituted alkylene group) wherein the anion component is selected from the group consisting of perfluoroalkylsulfonates, camphorsulfonate, benzenesulfonate, alkylbenzenesulfonates, fluorine-substituted benzenesulfonates, fluorine-substituted alkylbenzenesulfonates and halogen (provided that said anion is able to form an acid having a pKa lower than 11, and preferably lower than about 4), and/or wherein the cation component comprises one or more groups such as naphthyl, thienyl or pentafluorophenyl.

Such photo-acid generators may also include polymeric generators such as polymers with a molecular weight from about 500 to about 1,000,000 which have a sulfonium salt on their backbone and/or side chains and also have one or more organic photo-acid generating groups on side chains to generate acid by exposure to light; such polymers may be such as in preparative examples 1 and 2 of U.S. Pat. No. 6,660,479 wherein the salt may be p-toluenesulfonic salt, naphthalenesulfonic salt or 9,10-dimethoxy-2-anthracenesulfonic salt.

Two or more of the above-mentioned acids may also be suitable for the practice of the method of preferred embodiments, either in the form of mixtures as far as said acids may be used together under the reaction conditions (i.e. as far as their physical form allows for simultaneous reaction with the polymer to be modified) or by sequential reactions with the polymer in two or more steps.

According to a preferred embodiment, conjugated polymers can be obtained by acid-induced elimination of dithiocarbamate moieties that act as leaving groups. Such an embodiment is particularly suitable for the preparation of a conjugated polymer or copolymer including repeating units represented by the structural formula (II)

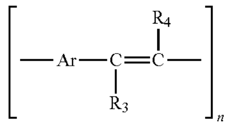
(II)

wherein Ar, $R_3$, $R_4$ and n are as defined herein above. Conjugated polymers obtained according to such an embodiment show a low structural defect level and increased $\lambda_{max}$ values compared to similar conjugated polymers obtained by heat treatment at higher temperatures (usually at least 150° C.) and/or higher conversion times (usually at least 3 hours).

According to another preferred embodiment, a nucleophile agent can be further added during the process. This nucleophilic agent can substitute some or all of the remaining dithiocarbamate groups. Such an embodiment is particularly suitable for the preparation of polymers or copolymers including repeating units represented by the structural formula (III)

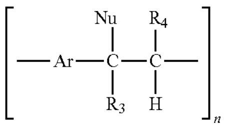
(III)

wherein Ar, $R_3$, $R_4$ and n are as described herein above and wherein Nu is a monovalent group derived from said nucleophile agent through abstraction of a hydrogen atom.

The process according to such a preferred embodiment allows for easy chemical modification, e.g. functionalization, of a precursor polymer obtained via the dithiocarbamate precursor route. Such a modification can be suitably used in order to introduce, in an easy and controllable way, chemical functions which can be used for example as (macro)-initiators in further reactions such as e.g. polymerization reactions. In this way grafted-copolymers can be synthesized which can be used for example in further reactions with bio-molecules to produce active layers useful for biosensors.

A broad range of nucleophile agents can be suitably used in the process according to such a preferred embodiment. Since the nucleophile agent is usually added under acidic conditions, simultaneously with or after addition of at least part of the acid used for conversion (elimination of dithiocarbamate moieties e.g. to form a conjugated polymer), the skilled person readily understands that the selection of an appropriate nucleophile agent needs to take such acidic conditions into account. Preferred nucleophile agents can be for example, but are not limited to, alcohols and/or alcoholates (e.g. alkali alcoholates), thiols and/or thiolates (e.g. alkali thiolates), phenols and/or phenolates (e.g. alkali phenolates), thiophenols and/or thiophenolates (e.g. alkali thiophenolates). Other suitable nucleophile agents include, but are not limited to, dialkylsulfur (e.g. di-$C_{1-20}$ alkylsulfur), aminoalkanes (e.g. primary $C_{1-20}$ alkylamines or primary $C_{3-20}$ cycloalkylamines); anilines and substituted anilines (wherein the one or more substituents of the phenyl ring are not susceptible of otherwise interfering with the acid modification or nucleophillic substitution reaction steps), benzylamine and substituted benzylamines (wherein the one or more substituents of the phenyl ring are not susceptible of otherwise interfering with the acid modification or nucleophillic substitution reaction steps), carboxylic aldehydes; carboxylic acid esters; thiocarboxylic acids; xanthates; carboxylic acid amides such as maleimides; dialkyl carbonates; nitroalkanes; cyanoalkanes; dialkylsulfoxides; dialkylsulfones; amino-acids; peptides; nucleosides; heterocyclic bases such as, but not limited to, imidazoles, quinolines, isoquinolines, pyridines, pyrazines and quinoxalines; alkaloids and modified DNA, and phosphines.

Carboxylic and sulfonic acids may also constitute suitable nucleophile agents. Some of them, especially when exhibiting a pKa at room temperature below 11, or even below 4, are peculiar in the sense that they also meet the criteria for performing the acid-induced elimination of dithiocarbamate moieties in a previous step of the method.

In a specific preferred embodiment the nucleophillic agent can be selected from the group consisting of compounds represented by one the structural formulae $R_5OH$, $R_5SH$, $R_6NH_2$, $RN_3$, $RSR_5$, $RCOOH$, $RCOSH$, $ROSSR_5$, $RCONR_5$, wherein each of R, $R_5$ and $R_6$ is independently selected from the group consisting of $C_{1-20}$ alkyl, $C_{2-20}$ alkenyl, aryl and aryl-$C_{1-4}$ alkyl.

The amount of nucleophile reagent suitable for addition in the process according to this embodiment may be from 0.1 to 10 molar equivalent of the dithiocarbamate moieties present in the starting polymer with the structural formula (I). For instance this amount may be from 0.5 to 5.0 molar equivalents or, more specifically, between 1.0 and 2.0 equivalents of the dithiocarbamate moieties of said polymer. Modified polymers and copolymers obtained in such a way can, when the nucleophile agent is properly selected, contain chromophores, bioactive molecules or functionalities that can take part in a further chemical reaction or a further polymerization process as a monomer or as an initiating site.

In yet another embodiment, the process according to the preferred embodiment can be applied in a two-step modification method of the polymer (I), i.e. performing both a partial dithiocarbamate conversion and a partial functionalization. In first instance, according to this particular embodiment, a number of substituents "Nu" (said substituents "Nu" being all the same or being different) are introduced into the polymer structure by using a limited amount of a strong acid (i.e. an amount such as not leading to conversion or not leading to complete conversion of the precursor into the conjugated polymer), more specifically a non-nucleophillic acid, in the presence of a nucleophile agent, e.g. a non-acidic or neutral nucleophile agent. Afterwards, the partly substituted precursor polymer can be further partially or completely converted (into a conjugated polymer) (with elimination of residual dithiocarbamate moieties) in the presence of an additional adequate amount of an acid (either the same or a different acid).

Furthermore, the ratio between substitution and elimination reactions during performance of the method of preferred embodiments can be controlled by monitoring the temperature (higher temperatures are known to the skilled person to favor the elimination reaction) and/or by adding a relatively stronger nucleophile agent, e.g. a strong nucleophillic agent (this being known to the skilled person to favor the substitution reaction).

According to a second aspect, polymers and copolymers are provided represented by the structural formula (IV)

(IV)

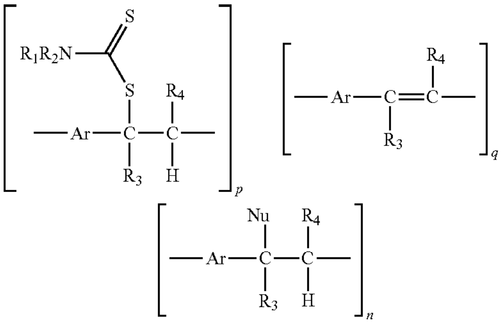

wherein:

Ar is as defined with respect to the structural formula (I), e.g. Ar is arylene or heteroarylene optionally substituted with one or more substituents independently selected from the group consisting of $C_{1-20}$ alkyl, $C_{1-20}$ alkoxy, $C_{1-20}$ alkylsulfate, poly(ethylene oxide) (PEO) or oligo (ethylene oxide), aryl and aryl-$C_{1-4}$ alkyl groups, wherein these aromatic divalent groups may comprise up to 4 heteroatoms chosen from the group comprising oxygen, sulphur, and nitrogen. Ar may be also a rigid three-dimensional group such as e.g. an iptycene.

$R_1$ and $R_2$ are as defined with respect to the structural formula (I), e.g. $R_1$ and $R_2$ are independently selected from the group consisting of $C_{1-20}$ alkyl, $C_{3-20}$ cycloalkyl, aryl, aryl-$C_{1-4}$ alkyl and heterocyclyl, $R_3$ and $R_4$ are as defined in the structural formula (I), e.g. $R_3$ and $R_4$ are independently selected from the group consisting of hydrogen, $C_{1-20}$ alkyl, $C_{3-20}$ cycloalkyl, aryl, aryl-$C_{1-4}$ alkyl and heterocyclyl, n, p, q are integers such as the number average molecular weight of the polymer or copolymer is from 5,000 to 1,000,000 Dalton, p and q are at least 0, and n is at least 1, and Nu is selected from the group consisting of $OR_5$, $SR_5$, $NHR_5$, $OC(O)R_5$, $SC(O)R_5$, wherein $R_5$ is selected from the group consisting of $C_{1-20}$ alkyl $C_{2-20}$ alkenyl and aryl.

According to a specific embodiment of the second aspect, the molecular weight polydispersity of the polymer or copolymer represented by the structural formula (IV) may range from about 1.05 to about 20, preferably from about 1.2 to about 10, more preferably from about 1.2 to about 5.0. In particular the molecular weight polydispersity of the polymer or copolymer represented by the structural formula (IV) may be above about 1.1, or above about 1.2, e.g. above about 1.3, or it may be below about 4.0, e.g. below about 3.0 or below about 2.0.

According to a third aspect, a device is provided comprising one or more layers, preferably at least one thin layer, of a polymer or copolymer represented by the structural formula (IV) according to any embodiment of the second aspect, or a polymer modified according to any embodiment of the method of the first aspect. According to a specific embodiment, this embodiment is particularly suitable for devices such as, but not limited to, a semiconductor device, a solar cell, a light-emitting diode, a chemical sensor, a biological sensor or an integrated circuit component.

According to a specific embodiment, this embodiment wherein Ar is a rigid three-dimensional moiety such as for example an iptycene group or a derivative thereof is particularly suitable for devices such as a chemical sensor or a biological sensor.

The present invention will be further described with reference to certain more specific embodiments and examples, but the present invention is not limited thereto but only by the attached claims.

The following examples are given by way of illustration only, and repeatedly include one or more of the following methodologies.

Obtaining of a Conjugated Polymer by Conversion in Solution with an Acid

A precursor polymer having dithiocarbamate moieties was synthesized via the so-called dithiocarbamate precursor route and then dissolved in a solvent until a given concentration was obtained and then degassed by passing through a continuous nitrogen flow. The relevant acid was added to the mixture and the temperature was optionally increased from 20° C. up to 70° C. during the conversion procedure.

Post-Functionalization of a Polymer after Conversion in Solution with an Acid

A partly converted precursor polymer was dissolved in a solvent until a given concentration was obtained and then degassed by passing through a continuous nitrogen flow. An adequate nucleophile agent was added (from equimolar amount to large excess) to the reaction mixture. An acid was then added. The temperature can optionally be increased from 20° C. up to 70° C. during a further conversion procedure leading to a polymer according to formula IV wherein q and n are at least 1.

Example 1

Conversion of a Dithiocarbamate-Containing poly(2,5-thienylene vinylene) Precursor Polymer with Benzenesulfonic Acid at 70° C.

To a solution of 70 mg of a precursor polymer with dithiocarbamate moieties (represented by the structural formula (I) wherein Ar=2,5-thienylene-3-hexyl, $R_1=R_2=C_2H_5$, $R_3=R_4=H$, Mw=57,000; Mn=22,000; PDI (polydispersity index)=2.5 dissolved in chlorobenzene (5 ml), benzenesulfonic acid (1.5 molar equivalents based on the amount of dithiocarbamate moieties in the precursor polymer) was added as a solid. The solution was heated at 70° C. under $N_2$. The color of the solution (precursor polymer+chlorobenzene) turned from pale orange to a darker color immediately after addition of the acid. After 10 minutes the color of the reaction mixture became deep blue, thus indicating a high conversion ratio. Samples were taken from the reaction mixture at different points in time (after 10 minutes; 1 hour and 5 hours, respectively) and worked up as follows. The excess of acid was neutralized and then an extraction with chloroform was carried out. After evaporation of the solvent, UV-Visible spectra (in film) were taken at room temperature for each sample and compared with the UV-Visible spectrum of a thermally converted comparative polymer (obtained by conversion in dichlorobenzene under reflux at 175° C. after 12 hours).

The conjugated polymer converted with the use of benzenesulfonic acid showed $\lambda_{max}$ values (586 nm after 1 hour, 610 nm after 5 hours) significantly higher than the comparative polymer converted under reflux at 175° C. in dichlorobenzene after 12 hours ($\lambda_{max}$ 572 nm). The spectral data of the produced polymer was consistent with the structural formula (II) wherein Ar=2,5-thienylene-3-hexyl, and $R_3=R_4=H$.

Example 2

Conversion of a Dithiocarbamate-Containing Poly(2,5-thienylene Vinylene) Precursor Polymer with Benzenesulfonic Acid without Heating A solution of a precursor polymer (as used in example 1) in chlorobenzene and 1.5 equivalents of benzenesulfonic acid (molar equivalents of the amount of dithiocarbamate moiety in the polymer) into a quartz cell was monitored by means of a UV-Visible technique. The spectra were taken every two minutes in the first five hours and every 20 minutes afterwards. The conversion was followed for 24 hours. The reaction mixture started to change color immediately after the addition of the acid. It was noticed that the $\lambda_{max}$ value of the product such obtained was 529 nm, meaning that the polymer was almost totally converted to its conjugated form (but not totally). A further heat treatment at 175° C. lead to a polymer with the $\lambda_{max}$ value of 530 nm, i.e. no significant increase of the $\lambda_{max}$ value was observed. This lower $\lambda_{max}$ value when compared to example 1 shows that a competition between conversion process and nucleophile substitution occurred using these experimental conditions. No conversion of the precursor polymer takes place in similar conditions, e.g. at room temperature, without the addition of the acid (only a broad peak at a $\lambda_{max}$ value comprised between 200 and 300 nm corresponding to the precursor polymer itself was observed).

Example 3

Conversion of a Dithiocarbamate-Containing poly(2,5-thienylene vinylene) Precursor Polymer with Benzenesulfonic Acid In order to control the rate of conversion, 0.3 equivalent of benzenesulfonic acid (molar equivalents of the amount of dithiocarbamate moiety in the polymer) were added to a solution of precursor polymer (as in example 1) in chlorobenzene. The reaction was followed in solution at room temperature by means of UV-Visible spectra taken every two minutes in the first five hours and every 20 minutes afterwards. The conversion was followed for 24 hours. The color of the reaction mixture after 24 hours appeared to be dark orange. Only a partial conversion was induced as it appears from the UV- Visible spectrum (very broad flat peak between 379 nm and 522 nm). The so prepared solution was kept and analyzed again after four days by UV-Visible, and it showed the presence of an improvement of the conversion of the precursor polymer into its conjugated form (as evidenced by a broad peak with two maximum values $\lambda_{max}$ at 426 and 524 nm). A further heat treatment at 175° C. during 12 hours gave a polymer with a $\lambda_{max}$ value of 570 nm. Accordingly this example shows that the speed and rate of the conversion reaction can be controlled by the amount of acid used and the reaction time. The substitution process can be limited by the amount of acid used (compared with the further heat treatment of example 2).

Example 4

Conversion of a Dithiocarbamate-Containing poly(2,5-thienylene vinylene) Precursor Polymer with Trifluoroacetic Acid To a solution of the precursor polymer of example 1 in chlorobenzene, trifluoroacetic acid as alternative to benzenesulfonic acid (1.5 molar equivalent based on the amount of dithiocarbamate moieties in the precursor polymer) was added. The reaction was monitored at room temperature in solution by UV-Visible spectrum. Fast conversion into the conjugated polymer was obtained, with a $\lambda_{max}$ value of 566 nm after 220 minutes. No sign of degradation was observed since a plateau in the absorption/time curve was observed.

Example 5

Conversion of a Dithiocarbamate-Containing poly(2,5-thienylene vinylene) Precursor Polymer with Trifluoroacetic Acid and Addition of a Thiol A few drops of octane-thiol were added to a mixture of the dithiocarbamate-containing precursor polymer of example 1 and trifluoroacetic acid (1.5 molar equivalents) in chlorobenzene. The reaction was followed by the evolution of the UV-Visible spectrum along time. In order to check whether nucleophillic substitution by the thiol onto the precursor polymer backbone has occurred, an oxidation of the resulting polymer was performed using $H_2O_2/TeO_2$ in dioxane. Comparison of the FT-I.R. spectra before and after oxidation clearly showed appearance of an absorption band characteristic of the presence of a sulfoxide group, thus confirming the presence of an octylthio group onto the polymer before oxidation.

Example 6 (Comparative)

Conversion of a Xanthate-Containing Poly(2,5-thienylene Vinylene) Precursor Polymer with Benzenesulfonic Acid A solution of xanthate precursor polymer having the following structure:

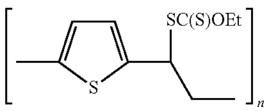

was dissolved in chlorobenzene into a quartz cell, 1.5 molar equivalents (based on the xanthate moieties) of benzenesulfonic acid was added and the reaction was monitored by UV-visible spectrum. Spectra were taken every two minutes in the first five hours and every 20 minutes afterwards until 24 hours. No sign of polymer conversion was observed, thus showing the specific nature of the acid conversion with dithiocarbamate groups.

Example 7

Conversion of a Dithiocarbamate-Containing poly(2,5-phenylene vinylene) Precursor Polymer with Benzenesulfonic Acid at 70° C.

To a solution of 200 mg of a MDMO-PPV dithiocarbamate precursor polymer (represented by the structural formula (I)) wherein Ar=2-methoxy-5-(3,7-dimethyloctyloxy)]-1,4-phenylene, $R_1=R_2=C_2H_5$, $R_3=R_4=H$ (Mw=220,000; Mn=94,000; polydispersity index=2.3) dissolved in 100 ml of chlorobenzene, benzenesulfonic acid (1.5 molar equivalents based on the amount of dithiocarbamate moieties in the precursor polymer) was added as a solid. The solution was heated at 70° C. under $N_2$. The colour of the solution (precursor polymer+chlorobenzene) turned from bright yellow to a darker orange colour immediately after addition of the acid. After 10 minutes the colour of the reaction mixture became red, thus indicating a high conversion ratio. Samples were taken from the reaction mixture at 2 different points in time (after 10 minutes and 1 hour, respectively) and worked up as follows. The excess of acid was neutralised and then an extraction with chloroform was carried out. After evaporation of the solvent, UV-Visible spectra (in film) were taken at room temperature for each sample and compared with the UV-Visible spectrum of a thermally converted comparative polymer (obtained by conversion in dichlorobenzene under reflux at 180° C. after 3 hours).

The conjugated polymer converted with the use of benzenesulfonic acid shows a $\lambda_{max}$ value of 510 nm after 1 hour indicating that the conversion reaction was already well advanced. The comparative polymer converted under reflux at 180° C. in dichlorobenzene did not show sign of started conversion reaction after 1 hour as no changes in colour were observed, after 3 hours at 180° C. a $\lambda_{max}$ of 530 nm is then obtained. Caution had to be taken because too long reaction time of the polymer in presence of benzenesulfonic acid may cause chemical degradation. The spectral data of the produced polymers were consistent with the structural formula (II).

Example 8

Conversion of a Dithiocarbamate-Containing poly(2,5-phenylene vinylene) Precursor Polymer with Trifluoroacetic Acid at 70° C.

To a solution of 200 mg of a MDMO-PPV dithiocarbamate precursor polymer (represented by the structural formula (I)) wherein Ar=2-methoxy-5-(3,7-dimethyloctyloxy)]-1,4-phenylene, $R_1=R_2=C_2H_5$, $R_3=R_4=H$ (Mw=220,000; Mn=94,000; polydispersity index=2.3) dissolved in 100 ml of chlorobenzene, trifluoroacetic acid (1.5 molar equivalents based on the amount of dithiocarbamate moieties in the precursor polymer) was added as a liquid. The solution was heated at 70° C. under $N_2$. The colour of the solution (precursor polymer+chlorobenzene) turned from bright yellow to a darker orange colour 3 hours after addition of the acid. After 8 hours the reaction mixture had a red colour, thus indicating a high conversion ratio. Samples were taken from the reaction mixture at different points in time (after 1, 3, 5 and 8 hours, respectively) and worked up as follows. The excess of acid was neutralised and then an extraction with chloroform was carried out. After evaporation of the solvent, UV-Visible spectra (in film) were taken at room temperature for each sample and compared with the UV-Visible spectrum of a thermally converted comparative polymer (obtained by conversion in dichlorobenzene under reflux at 180° C. after 3 hours). The conjugated polymer converted with the use of trifluoroacetic acid at 70° C. showed a maximum absorption wavelength at 480 nm after 3 hours and a $\lambda_{max}$ value of 540 nm after 8 hours. The comparative polymer converted under reflux at 180° C. in dichlorobenzene after 3 hours showed a $\lambda_{max}$ of 530 nm. The use of trifluoroacetic acid required a longer reaction time than a thermal elimination at 180° C., but higher value for the maximum absorption wavelength $\lambda_{max}$ was obtained for a reaction performed at much lower temperature meaning only 70° C. This high value for the $\lambda_{max}$ indicated a high conversion ratio but also a longer average conjugation length of conjugated system meaning less chemical defects in the conjugated polymer backbone. Also no sign of degradation was observed since a plateau in the absorption/time curve was observed.

Example 9

Synthesis of Dithiocarbamate-Containing Triptycene Molecules for Making Precursor and Conjugated Polymers For trypticene compounds represented by the structural formulae (XIV), (XVI) and (XVIII), R is hydrogen. For trypticene compounds represented by the structural formulae (XV), (XVII) and (XIX), R is 2-ethylhexyloxy.

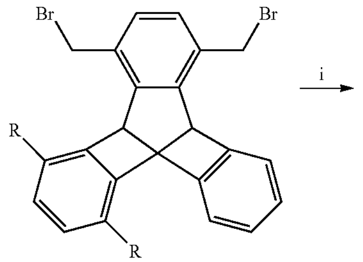

XIV, XV

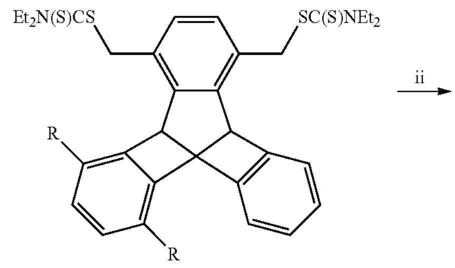

XVI, XVII

-continued

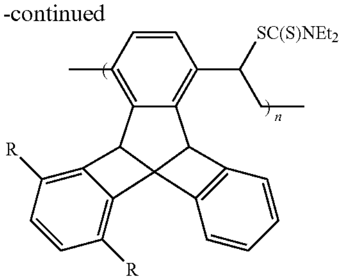

XVIII, XIX 1,4-bis-bromomethyltriptycene (XIV) and the analog compound (XV) have been synthesized according to the procedure described in FIG. 16 B of U.S. patent publication No. 2006073607; compound (XIV) has been characterized as follows:

$^1$H NMR ($CDCl_3$): chemical shifts at 7.45 ppm (q, 4H), 7.03 ppm (m, 4H), 6.89 ppm (s, 2H), 5.83 ppm (s, 2H) and 4.66 ppm (s, 4H); and MS (EI, m/e): 440 ($M^+$), 360 ($M^+$–Br), 280 ($M^+$–2×Br), 266 ($M^+$–$CH_2Br_2$), 252 ($M^+$–2×$CH_2$Br).

Triptycene-1,4-diylbismethylene N,N-diethyl dithiocarbamate (XVI)

A mixture of 1,4-bis-bromomethyltriptycene (XIV) (0.70 g, 1.6 mmol) and sodium diethyldithiocarbamate trihydrate (0.82 g, 3.7 mmol) in 40 mL of ethanol was stirred for three days at room temperature. Subsequently, water (30 mL) was added and the mixture was extracted with $CHCl_3$ (3×50 mL) and dried over $MgSO_4$. The crude reaction mixture was purified by column chromatography (silica, n-hexane/$CHCl_3$ 1/1) after which the dithiocarbamate-containing tryticene monomer (XVI) was recrystallized in ethanol, obtained as a white solid (0.44 g, 48% yield) which has been characterized as follows:

$^1$H NMR ($CDCl_3$): chemical shifts at 7.37 ppm (q, 4H), 6.96 ppm (q, 4H), 6.92 ppm (s, 2H), 5.78 ppm (s, 2H), 4.69 ppm (s, 4H), 4.09 ppm (q, J=7.2 Hz, 4H), 3.70 ppm (q, J=7.2 Hz, 4H), and 1.29 ppm (2t, J=7.2 Hz, 12H);

$^{13}$C NMR ($CDCl_3$): 194.79, 145.57, 144.82, 129.14, 126.97, 125.07, 123.71, 50.21, 49.42, 46.66, 40.16, 12.42, and 11.60;

DIP MS (EI, m/e): 576 ($M^+$), 428 ($M^+$–SC(S)$NEt_2$), 280 ($M^+$–2×SC(S)$NEt_2$), 148 (SC(S)$NEt_2$), 116, (C(S) $NEt_2$).

5,8-Bis(2-ethylhexyloxy)triptycene-1,4-diylbismethylene N,N diethyl dithio-carbamate (XVII)

Compound (XVII) was produced by analogy to compound (XVI), but starting from compound (XV) (0.88 g, 1.26 mmol) and sodium diethyldithio-carbamate trihydrate (0.65 g, 2.89 mmol). After recrystallization in ethanol, compound (XVII) was obtained as a white solid (0.63 g, 55% yield) and has been characterized by nuclear magnetic resonance as follows:

$^1$H NMR ($CDCl_3$): chemical shifts at 7.37 ppm (m, 2H), 6.97 ppm (s, 2H), 6.94 ppm (m, 2H), 6.46 ppm (s, 2H), 6.20 ppm (s, 2H), 4.83 ppm (d, 2H), 4.53 ppm (d, 2H), 4.03 ppm (m, 4H), 3.52-3.94 ppm (m, 8H), 1.80 ppm (m, 2H), 1.38-1.65 ppm (m, 16H), 1.27 ppm (2t, 12H), and 0.95-1.07 ppm (m, 12H);

Precursor Polymers (XVIII)

A solution of the dithiocarbamate-containing tryticene monomer (XVI) (400 mg, 0.694 mmol) in dry THF (3.47 mL, 0.2 M) at room temperature or 65° C. was degassed for 15 minutes by passing through a continuous stream of $N_2$ after which a strong base, lithium diisopropylamide (LDA) (347 μL of a 2 M solution in THF/n-heptane) or lithium hexamethyldisilazide (LHMDS) (764 μl/3060 μl of a 1M solution in THF) was added in one portion. The mixture was kept at room temperature or 65° C. for 90 minutes. The reaction mixture was quenched in ice water (100 mL), and neutralized with HCl (1M in $H_2O$). Subsequently, the aqueous phase was extracted with $CH_2Cl_2$ (3×60 mL). The organic layers were combined and the solvents were removed by evaporation under reduced pressure. The resulting crude polymer was re-dissolved in $CHCl_3$ (2 mL) and precipitated in MeOH (100 mL) at 0° C. The polymer was collected and dried in vacuo. A white solid was obtained (180 mg, yield 61% with respect to LDA) which characterized by nuclear magnetic resonance as follows:

$^1$H NMR ($CDCl_3$): chemical shifts at 6.4-7.8 ppm (br m, 10H), 5.9-6.4 ppm (br s, 2H), 5.6-5.9 ppm (br s, 1H), 4.0-4.3 ppm (br s, 2H), 3.7-4.0 ppm (br s, 2H), 3.2-3.7 ppm (br s, 2H), and 0.8-1.4 ppm (2 br s, 6H).

Precursor Polymer (XIX)

Polymer (XIX) was obtained by analogy to polymer (XVIII) but starting from compound (XVII) (400 mg, 0.481 mmol) and LDA (240 μL of a 2 M solution in THF/n-heptane) or LHMDS (481 μL of a 1M solution in THF). A light yellow solid was obtained (187 mg, yield 57%) which characterized by nuclear magnetic resonance as follows:

$^1$H NMR ($CDCl_3$): chemical shifts at 5.8-7.8 ppm (br m, 10+2+1H), 3.0-4.4 ppm (br m, 4+4H), and 0.3-2.2 ppm (br m, 30+6H).

Example 10

Conversion of a Dithiocarbamate-Containing poly(iptycene vinylene) Precursor Polymer Derivative with Benzenesulfonic Acid at 70° C.

To a solution of 100 mg of a precursor polymer with dithiocarbamate moieties (XIX, corresponding to the structural formula (I) wherein Ar=1,4-bis(2-ethylhexyloxy)-9,10-dihydro-9,10[1',2']benzenoanthracene, $R_1$=$R_2$=$C_2H_5$, $R_3$=$R_4$=H, Mw=66,500 Mn=12,800 polydispersity index=5.2 dissolved in chlorobenzene (5 ml), benzenesulfonic acid (1.5 molar equivalents based on the amount of dithiocarbamate moieties in the precursor polymer) was added as a solid. The solution was heated at 70° C. under $N_2$. The colour of the solution turned from light yellow to orange yellow immediately after addition of the acid. It took more then 4 hours before the solution became fluorescent yellow what is an indication that an amount of precursor polymer is being converted into the conjugated form. Samples were taken from the reaction mixture at different points in time (after 10 minutes; 30 minutes; 1 hour; 2 hours, 4 hours, 24 hours and 48 hours, respectively) and worked up as follows. The excess of acid was neutralised with $NaHCO_3$ and then an extraction with chloroform was carried out. After evaporation of the solvent, UV-Visible spectra (in film) were taken at room temperature for each sample. Curves c, d and e of FIG. 1 are the UV-Visible spectra taken after 1, 24 and 48 hours of conversion respectively. A peak at 360 nm appears gradually over time indicating conversion to the conjugated polymer into a diethylhexyloxy-substituted poly(triptycenylene-vinylene) derivative represented by the structural formula (XIII)

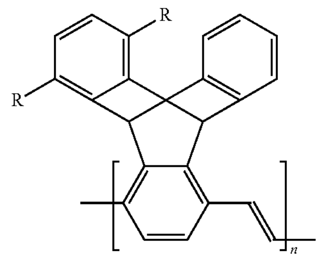

R = 2-ethyllexyloxy

Example 11

Conversion of a Dithiocarbamate-Containing Unsubstituted poly(triptycenylene vinylene) Precursor Polymer with Benzenesulfonic Acid The same experimental procedure of example 10 is repeated, except for using a dithiocarbamate-containing precursor polymer represented by the structural formula (I) wherein Ar=unsubstituted triptycenyl, $R_1$=$R_2$=$C_2H_5$, and $R_3$=$R_4$=H. Conversion into a poly(triptycenylene vinylene) derivative represented by the structural formula (XII) is observed.

XII

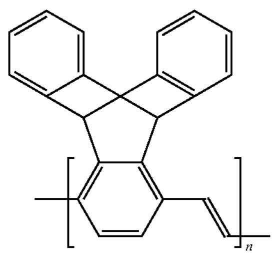

Example 12

Conversion of a Dithiocarbamate-Containing poly(iptycene vinylene) Precursor Polymer with Trifluoroacetic Acid at 70° C.

To a solution of 100 mg of poly(iptycene vinylene) precursor polymer derivative with dithiocarbamate moieties (XIX, corresponding to the structural formula (I) wherein Ar=1,4-bis(2-ethylhexyloxy)-9,10-dihydro-9,10[1',2']-benzoanthracene, $R_1$=$R_2$=$C_2H_5$, $R_3$=$R_4$=H, Mw=66,500 Mn=12,800; polydispersity index=5.2) dissolved in chlorobenzene (5 ml), trifluoroacetic acid (1.5 molar equivalent based on the amount of dithiocarbamate moieties in the precursor polymer) was added in one go as a liquid. The solution was heated at 70° C. under $N_2$. No conversion took place after 5 hours, but a longer conversion time is necessary. Samples were taken from the reaction mixture at different points in time (after 1 hour and 5 hours respectively). After evaporation of the solvent, UV-Visible spectra (in film) were taken at room temperature for each sample. Curves a and b of FIG. 1 are the UV-Visible spectra taken after 1 and 5 hours of conversion respectively.

Example 13

Conversion of a Dithiocarbamate-Containing poly(2,5-thienylene vinylene) Precursor Polymer with Trifluoroacetic Acid and Addition of Methanol The experimental procedure of example 5 is repeated, except for using methanol instead of octane-thiol. Similar observations can be made, including the indirect control of a methoxy group present onto the resulting polymer.

Example 14

Conversion of a Dithiocarbamate-Containing poly(2,5-thienylene vinylene) Precursor Polymer with Trifluoroacetic Acid and Addition of Phenol The experimental procedure of example 5 is repeated, except for using phenol instead of octanethiol. Similar observations can be made, including the indirect control of a phenoxy group present onto the resulting polymer.

Example 15

Conversion of a Dithiocarbamate-Containing poly(2,5-thienylene vinylene) Precursor Polymer with Trifluoroacetic Acid and Addition of Benzyl Alcohol The experimental procedure of example 5 is repeated, except for using benzyl alcohol instead of octanethiol. Similar observations can be made, including the indirect control of a benzyloxy group present onto the resulting polymer.

Example 16

Conversion of a Dithiocarbamate-Containing poly(2,5-thienylene vinylene) Precursor Polymer with Trifluoroacetic Acid and Addition of 3-buten-2-ol The experimental procedure of example 5 is repeated, except for using methanol instead of octanethiol. Similar observations can be made, including the indirect control of a 3-buten-2-oxy group present onto the resulting polymer.

Example 17

Conversion of a Dithiocarbamate-Containing poly(2,5-thienylene vinylene) Precursor Polymer with Trifluoroacetic Acid and Addition of Thiophenol The experimental procedure of example 5 is repeated, except for using thiophenol instead of octanethiol. Similar observations can be made, including the indirect control of a phenylthio group present onto the resulting polymer.

Example 18

Conversion of a Dithiocarbamate-Containing poly(2,5-thienylene vinylene) Precursor Polymer with Trifluoroacetic Acid and Addition of Allylmercaptan The experimental procedure of example 5 is repeated, except for using methanol instead of octane-thiol. Similar observations can be made, including the indirect control of a 2-propene-1-thio group present onto the resulting polymer.

Example 19

Conversion of a Dithiocarbamate-Containing poly(2,5-thienylene vinylene) Precursor Polymer with Trifluoroacetic Acid and Addition of Methylamine The experimental procedure of example 5 is repeated, except for using methylamine instead of octanethiol. Similar observations can be made, including the indirect control of a methylamino group present onto the resulting polymer.

Example 20

Conversion of a Dithiocarbamate-Containing poly(2,5-thienylene vinylene) Precursor Polymer with Trifluoroacetic Acid and Addition of Allylamine The experimental procedure of example 5 is repeated, except for using allylamine instead of octanethiol. Similar observations can be made, including the indirect control of a propene-2-amino group present onto the resulting polymer.

Example 21

Conversion of a Dithiocarbamate-Containing poly(2,5-thienylene vinylene) Precursor Polymer with Trifluoroacetic Acid and Addition of Aniline The experimental procedure of example 5 is repeated, except for using aniline instead of octanethiol. Similar observations can be made, including the indirect control of an anilino group present onto the resulting polymer.

Example 22

Conversion of a Dithiocarbamate-Containing poly(2,5-thienylene vinylene) Precursor Polymer with Trifluoroacetic Acid and Addition of Benzylamine The experimental procedure of example 5 is repeated, except for using benzylamine instead of octanethiol. Similar observations can be made, including the indirect control of a benzylamino group present onto the resulting polymer.

Example 23

Conversion of a Dithiocarbamate-Containing poly(2,5-thienylene vinylene) Precursor Polymer with Trifluoroacetic Acid and Addition of Thioacetic Acid The experimental procedure of example 5 is repeated, except for using thiolacetic acid instead of octanethiol. Similar observations can be made, including the indirect control of an acetylthio group present onto the resulting polymer.

Example 24

Conversion of a Dithiocarbamate-Containing poly(2,5-thienylene vinylene) Precursor Polymer with Trifluoroacetic Acid and Addition of Acetic Acid The experimental procedure of example 5 is repeated, except for using acetic acid instead of octanethiol. Similar observations can be made, including the indirect control of an acetoxy group present onto the resulting polymer.

Example 25

Conversion of a Dithiocarbamate-Containing poly(2,5-thienylene vinylene) Precursor Polymer with Trifluoroacetic Acid and Addition of Benzoic Acid The experimental procedure of example 5 is repeated, except for using benzoic acid instead of octanethiol. Similar observations can be made, including the indirect control of a benzoxy group present onto the resulting polymer.

Example 26

Modification of a Dithiocarbamate-Containing poly(2,5-thienylene vinylene) Precursor Polymer with Benzenesulfonic Acid Followed by the Addition of a Biotin Derivative such as Biotin-PEO2-PPO2-Amine or Biotin Ethylenediamine 5 molar equivalents of a biotin based derivative represented by the structural formula below

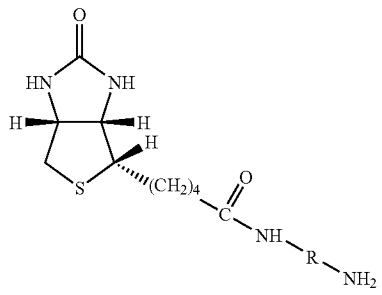

wherein R is e.g., but not limited to, $CH_2—CH_2$ or $CH_2—CH_2—(CH_2—O)_3—CH_2—CH_2$, is added to a mixture of the dithiocarbamate-containing precursor polymer of example 1 and benzenesulfonic acid (1.5 molar equivalent, based on dithiocarbamate moieties) in chlorobenzene. Substitution of the dithiocarbamate groups by the biotin moiety via the terminal $—NH_2$ function onto the precursor polymer backbone occurs, as evidenced by FT-IR and NMR spectra.

Example 27

Modification of a Dithiocarbamate-Containing poly(p-phenylene vinylene) Precursor Polymer with Benzenesulfonic Acid Followed by the Addition of a Biotin Derivative 5 Molar equivalents of a biotin based derivative as described in example 26 is added to a mixture of the dithiocarbamate-containing precursor polymer of example 1 and benzenesulfonic acid (1.5 molar equivalent, based on dithiocarbamate moieties) in chlorobenzene. Substitution of the dithiocarbamate groups by the biotin moiety via the terminal $—NH_2$ function onto the precursor polymer backbone occurs, as evidenced by FT-IR and NMR spectra.

Example 28

Modification of a Dithiocarbamate-Containing poly(triptycenylene-vinylene) Precursor Polymer with Benzenesulfonic Acid Followed by the Addition of a Biotin Derivative Such as Biotin-PEO2-PPO2-Amine or Biotin Ethylenediamine 5 Molar equivalents of a biotin based derivative as described in example 26 is added to a mixture of the precursor polymer of example 1 and benzenesulfonic acid (1.5 molar equivalent, based on dithiocarbamate moieties) in chlorobenzene. Substitution of the dithiocarbamate groups by the biotin moiety via the terminal $—NH_2$ function onto the precursor polymer backbone occurs, as evidenced by FT-IR and NMR spectra.

Example 29

Modification of a Dithiocarbamate-Containing poly(2,5-thienylene vinylene) Precursor Polymer with Benzenesulfonic Acid Followed by the Addition of a Maleimide Derivative Such as 6-maleimidocaproic acid or 4-maleimidobutanoic acid 5 Molar equivalents of a maleimide based derivative represented by the structural formula

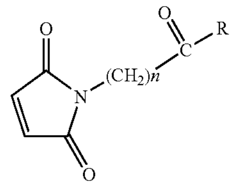

wherein n is an integer e.g. from 3 to 5 but not limited thereto, and R is e.g. hydroxy, are added to a mixture of the precursor polymer of example 1 and benzenesulfonic acid (1.5 molar equivalent, based on dithiocarbamate moieties) in chlorobenzene. Substitution of the dithiocarbamate moieties by the maleimide based derivative via the terminal carboxylic acid group onto the precursor polymer backbone occurs, as evidenced by FT-IR and NMR spectra.

Example 30

Modification of a Dithiocarbamate-Containing poly(p-phenylene-vinylene) Precursor Polymer with Benzenesulfonic Acid Followed by the Addition of a Maleimide Derivative Such as 6-maleimidocaproic acid or 4-maleimidobutanoic acid 5 Molar equivalents of a maleimide based derivative as described in example 29 are added to a mixture of the precursor polymer of example 1 and benzenesulfonic acid (1.5 molar equivalent, based on dithiocarbamate moieties) in chlorobenzene. Substitution of the dithiocarbamate moieties by the maleimide based derivative via the terminal carboxylic acid group onto the precursor polymer backbone occurs, as evidenced by FT-IR and NMR spectra.

Example 31

Modification of a Dithiocarbamate-Containing poly(triptycenylene vinylene) Precursor Polymer with Benzenesulfonic Acid Followed by the Addition of a Maleimide Derivative such as 6-maleimidocaproic acid or 4-maleimidobutanoic acid 5 Molar equivalents of a maleimide based derivative as described in example 29 are added to a mixture of the precursor polymer of example 1 and benzenesulfonic acid (1.5 molar equivalent, based on dithiocarbamate moieties) in chlorobenzene. Substitution of the dithiocarbamate moieties by the maleimide based derivative via the terminal carboxylic acid group onto the precursor polymer backbone occurs.

What is claimed is:

1. A method for modifying a polymer, the method comprising:

reacting an acid with a polymer having dithiocarbamate moieties and a structural formula (I):

(I)

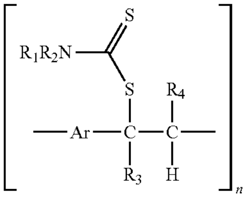

wherein:

Ar is selected from the group consisting of arylene and heteroarylene, wherein Ar is unsubstituted or substituted with one or more substituents independently selected from the group consisting of $C_{1-20}$ alkyl, $C_{1-20}$ alkoxy, $C_{1-20}$ alkylsulfate, poly(ethylene oxide), oligo(ethylene oxide), poly(ethylene glycol), oligo(ethylene glycol), aryl, and aryl-$C_{1-4}$ alkyl, wherein the heteroarylene comprises up to 4 heteroatoms independently selected from the group consisting of oxygen, sulfur, and nitrogen;

$R_1$ and $R_2$ are independently selected from the group consisting of $C_{1-20}$ alkyl, $C_{3-10}$ cycloalkyl, aryl, aryl-$C_{1-20}$ alkyl and heterocyclyl;

$R_3$ and $R_4$ are independently selected from the group consisting of hydrogen, $C_{1-20}$ alkyl, $C_{3-10}$ cycloalkyl, aryl, aryl-$C_{1-4}$ alkyl and heterocyclyl; and n is such that a number average molecular weight of the polymer is from about 5,000 to about 1,000,000 Dalton, whereby a modified polymer is obtained.

2. The method of claim 1, wherein the step of reacting the acid with the polymer results in at least one of formation of a conjugated polymer and substitution of at least a portion of the dithiocarbamate moieties so as to introduce another functionality.

3. The method of claim 2, wherein the conjugated polymer has a structural formula:

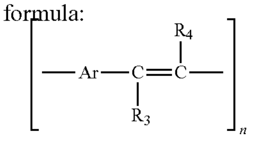

wherein Ar, $R_3$, $R_4$ and n are as defined in claim 1.

4. The method of claim 1, wherein an amount of the acid reacted with the polymer is from about 0.1 to about 3.0 molar equivalents of the dithiocarbamate moieties present in the polymer.

5. The method of claim 1, wherein reacting the acid with the polymer is performed at a temperature of from about −30° C. to about +130° C.

6. The method of claim 1, wherein Ar is selected from the group consisting of 1,4-phenylene, 2,6-naphthalenediyl, 1,4-naphthalenediyl, 1,4-anthracenediyl, 2,6-anthracenediyl, 9,10-anthracenediyl, 2,5-thienylene, 2,5-furanediyl, 2,5-pyrrolediyl, 1,3,4-oxadiazole-2,5-dyil, 1,3,4-thiadiazole-2,5-diyl, 2,3-benzo [c]thienylene, thieno [3,2-b]thiophene-2,5-diyl, pyrrolo [3,2-b]pyrrole-2,5-diyl, pyrene-2,7-diyl, 4,5,9,10-tetrahydropyrene-2,7-diyl, 4,4'-bi-phenylene, phenantrene-2,7-diyl, 9,10-dihydrophenantrene-2,7-diyl, dibenzofurane-2,7-diyl, dibenzothiophene-2,7-diyl, substituted triptycenylene, non-substituted triptycenylene, substituted pentipty-cenylene, non-substituted pentipty-cenylene, substituted iptycenylene, and non-substituted iptycenylene.

7. The method of claim 1, further comprising:

reacting a nucleophile agent with the polymer.

8. The method of claim 7, wherein the nucleophile agent is selected from the group consisting of alcohols, thiols, phenols, thiophenols, alcoholates, thiolates, phenolates, thiophenolates, dialkylsulfurs, aminoalkanes, anilines, substituted anilines, benzylamine, substituted benzylamines, carboxylic acids, carboxylic aldehydes, carboxylic acid esters, thiocarboxylic acids, thiocarboxylic esters, sulfonic acids, xanthates, carboxylic acid amides, amino-acids, peptides, nucleosides, heterocyclic bases, alkaloids, and modified deoxyribonucleic acid.

9. The method of claim 7, yielding a modified polymer having repeating units represented by a structural formula (III):

(III)

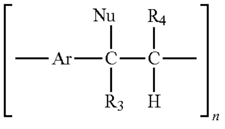

wherein Ar, $R_3$, $R_4$ and n are as defined in claim 1 and wherein Nu is a monovalent group derived from the nucleophile agent.

10. The method of claim 9, wherein Nu is selected from the group consisting of $OR_5$, $SR_5$, $NHR_6$, $OC(O)R_5$, $SC(O)R_5$, wherein $R_5$ is selected from the group consisting of $C_{1-20}$ alkyl, $C_{2-20}$ alkenyl, and aryl, and wherein $R_6$ is selected from the group consisting of $C_{1-20}$ alkyl, $C_{2-20}$ alkenyl, and aryl.

11. The method of claim 7, wherein an amount of the nucleophile agent added to the polymer is from about 0.1 to about 10 molar equivalents of the dithiocarbamate moieties present in the polymer represented by the structural formula (I).

12. The method of claim 1, wherein the acid exhibits a pKa of from about −10 to about +11.

13. The method of claim 1, wherein the acid is an organic acid selected from the group consisting of carboxylic acids, phosphonic acids, sulfonic acids, and mixtures thereof.

14. The method of claim 1, wherein the acid is an inorganic acid.

* * * * *

UNITED STATES PATENT AND TRADEMARK OFFICE

CERTIFICATE OF CORRECTION

PATENT NO. : 8,173,999 B2
APPLICATION NO. : 12/183937
DATED : May 8, 2012
INVENTOR(S) : Lutsen et al.

It is certified that error appears in the above-identified patent and that said Letters Patent is hereby corrected as shown below:

| Issued Patent Column | Line | Description of Discrepancy |
|---|---|---|
| On the Title Page (Item 75) (Inventors) | 1 | Change "Btanche" for Laurence Lutsen to --Branche--. |
| On the Title Page (Item 57) (Abstract) | 5 | Change "nucleophillic" to --nucleophilic--. |
| On the Title Page (Item 57) (Abstract) | 6 | Change "nucleophillic" to --nucleophilic--. |
| In the Specifications: | | |
| 2 | 38 | Change "nucleophillic" to --nucleophilic--. |
| 2 | 39 | Change "nucleophillic" to --nucleophilic--. |
| 2 | 41 | Change "nucleophillic" to --nucleophilic--. |
| 2 | 42 | Change "nucleophillic" to --nucleophilic--. |
| 2 | 43 | Change "nucleophillic" to --nucleophilic--. |
| 2 | 44 | Change "nucleophillic" to --nucleophilic--. |
| 2 | 60 | Change "nucleophillic" to --nucleophilic--. |
| 4 | 51 | Change "thiamorpholinyl," to --thiomorpholinyl,--. |

Signed and Sealed this
Eighteenth Day of September, 2012

David J. Kappos

David J. Kappos
*Director of the United States Patent and Trademark Office*

| | | |
|---|---|---|
| 4 | 60 | Change “quinoleinyl, oxyquinoleinyl,” to --quinolinyl, oxyquinolinyl,--. |
| 5 | 25-26 | Change “phtalazinyl), phtalidyl, phtalimidinyl, phtalazonyl,” to --phthalazinyl), phthalidyl, phthalimidinyl, phthalazonyl,--. |
| 6 | 48 | Change “(nucleophillic” to --(nucleophilic--. |
| 7 | 21 | Change “alkyl” to --alkyl,--. |
| 7 | 24 | Change “alkyl” to --alkyl,--. |
| 7 | 30 (Approx.) | Change “alkyl” to --alkyl,--. |
| 7 | 33 | Change “alkyl” to --alkyl,--. |
| 7 | 34 | Change “alkyl” to --alkyl,--. |
| 7 | 54 | Change “dyil;” to --diyl;--. |
| 7 | 58 | Change “phenantrene” to --phenanthrene--. |
| 7 | 58 | Change “dihydrophenantrene” to --dihydrophenanthrene--. |
| 10 | 19 | Change “nucleophillic” to --nucleophilic--. |
| 10 | 33 | Change “nucleophillic” to --nucleophilic--. |
| 10 | 40 | Change “nitrites,” to --nitriles,--. |
| 11 | 12 | Change “$HOIO_3$.” to --$HOClO_3$.--. |
| 11 | 36 | Change “furanecarboxylic” to --furancarboxylic--. |
| 13 | 26-27 | Change “nucleophillic” to --nucleophilic--. |
| 13 | 30 | Change “nucleophillic” to --nucleophilic--. |
| 13 | 45 | Change “nucleophillic” to --nucleophilic--. |
| 14 | 7 | Change “non-nucleophillic” to --non-nucleophilic--. |
| 14 | 21 | Change “nucleophillic” to --nucleophilic--. |
| 14 | 67 | Change “alkyl” to --alkyl,--. |
| 17 | 43 | Change “nucleophillic” to --nucleophilic--. |
| 19 | 23 | Change “meaning less” to --meaningless--. |
| 19 | 36-37 | Change “tryticene” to --triptycene--. |
| 20 | 35 (Approx.) | Change “tryticene” to --triptycene--. |

| | | |
|---|---|---|
| 20 | 62 | Change "(m, 12H);"to --(m, 12H).--. |
| 20 | 66 | Change "tryticene" to --triptycene--. |
| 21 | 52 | Change "more then" to --more than--. |
| 22 | 11 (Approx.) | Change "R=2-ethyllexyloxy" to --R=2-ethylhexyloxy--. |
| In the Claims: | | |
| 28 | 11 (Approx.) | In Claim 6, change "dyil," to --diyl,--. |
| 28 | 15 (Approx.) | In Claim 6, change "phenantrene" to --phenanthrene--. |
| 28 | 15 (Approx.) | In Claim 6, change "dihydrophenantrene" to --dihydrophenanthrene--. |